Dec. 27, 1938.   W. A. EATON   2,141,688
BRAKE MECHANISM
Filed Aug. 30, 1935
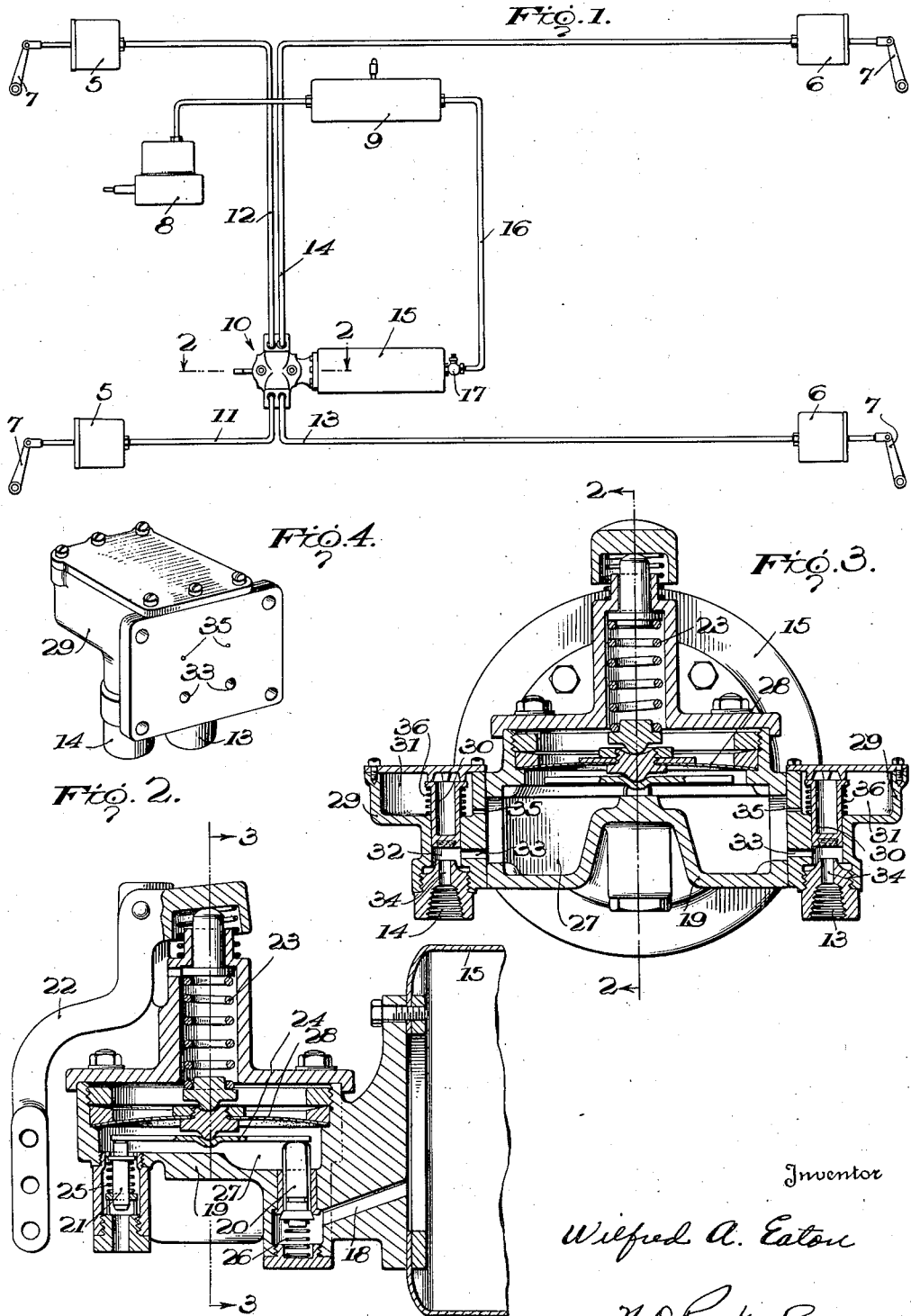
Inventor
Wilfred A. Eaton
H. D. Parker Jr.
Attorney Patented Dec. 27, 1938

2,141,688

UNITED STATES PATENT OFFICE 2,141,688

BRAKE MECHANISM

Wilfred A. Eaton, Pittsburgh, Pa., assignor to Bendix-Westinghouse Automotive Air Brake Company, Pittsburgh, Pa., a corporation of Delaware Application August 30, 1935, Serial No. 38,606

12 Claims. (Cl. 303—84)

This invention relates to fluid pressure braking systems and more particularly to systems of the type utilizing an expansible fluid medium for effecting actuation of vehicle brakes.

One of the objects of the present invention is to provide a novel fluid pressure braking system of the type utilizing an expansible fluid medium wherein effective operation of the system may be continued notwithstanding the breakage or rupture of one of the fluid pressure conduits.

Another object is to provide, in a system of the above character, a novel mechanism for preventing loss of the fluid pressure braking medium in the event of a broken fluid pressure conduit.

Still another object is to provide a novel valve device for use in connection with a braking system of the type referred to, and which shall be automatically operable, in the event of a broken fluid pressure conduit, to interrupt communication between the fluid pressure source and such conduit irrespective of continued operation of the brake valve.

A further object is to provide a novel safety arrangement for use in connection with fluid pressure braking systems which, in addition to increasing the reliability of such systems and their capability of braking a vehicle irrespective of a broken conduit, yet conserves the supply of fluid pressure medium, thus enabling efficient operation of the vehicle until the broken conduit may be permanently repaired.

The above and other objects will appear more fully hereinafter from a consideration of the following detailed description in connection with the accompanying drawing, wherein one desirable form of the invention is illustrated. It is to be expressly understood, however, that the drawing is employed for purposes of illustration only and is not to be taken as a definition of the limits of the invention, reference being had for this purpose to the appended claims.

Referring to the drawing, wherein similar reference characters refer to similar parts throughout the several views:

Fig. 1 is a diagrammatic view of a fluid pressure braking system embodying the present invention;

Fig. 2 is a side view, partly in section, of a brake valve utilized in connection with the system shown in Fig. 1;

Fig. 3 is a sectional view of the brake valve shown in Fig. 2, taken along line 3—3 of the latter and illustrating in section the valve mechanisms for interrupting flow of fluid pressure through the conduits in the event of rupture of the latter, and Fig. 4 is a perspective view of the safety valves illustrated in connection with Fig. 3.

Referring more particularly to Fig. 1, the present invention is illustrated therein as being embodied in a fluid pressure braking system adapted for use in connection with a vehicle having four-wheel brakes. As shown, the system comprises front brake chambers 5 and rear brake chambers 6, such chambers being adapted to actuate suitable braking members 7 operatively connected to the vehicle brakes. As is usual in systems of this character, an air compressor 8 suitably drivably connected with the vehicle engine is employed for charging a reservoir 9, a brake valve 10 being employed for controlling the application and release of fluid pressure to and from the brake chambers through conduits 11, 12, 13 and 14. In the present arrangement, the reservoir 9 communicates with a second reservoir 15 through a conduit 16, a check valve 17 being interposed between the two reservoirs and permitting flow of fluid pressure from the reservoir 9 to the reservoir 15 only.

As shown more particularly in Fig. 2, the reservoir 15 communicates directly with the brake valve 10 by means of a passage 18, this construction being employed for the purpose of eliminating the usual conduit connection between the reservoir and brake valve. The latter may be of any suitable construction and in the form shown includes a casing 19 provided with intake and exhaust valves 20 and 21 respectively, the latter being normally open to atmosphere and serving to exhaust the brake chambers 5 and 6 through conduits 11, 12, 13 and 14. Closure of the exhaust valve 21 and opening of the intake valve 20 is effected through actuation of a manually-operable lever 22 which serves to compress a graduating spring 23, thus exerting a pressure upon the valve-actuating plate 24. When this operation occurs, exhaust valve 21 will be closed, prior to the opening of intake valve 20, this sequence of operation being secured through the use of an exhaust valve spring 25 and an intake valve spring 26, the latter being stronger than the former.

With the exhaust valve closed and the intake valve open, fluid pressure will be conducted from the reservoir 15 to a chamber 27 through passage 18 and to the brake chambers in a manner to be described hereinafter. Preferably, the brake valve mechanism employed is of the self-lapping type and includes a diaphragm 28 which is subjected at all times to the pressure of the fluid conducted to the brake chambers.

Referring more particularly to Fig. 3, the novel safety valve construction constituting the present invention is illustrated therein as including a pair of casings 29, one of which is disposed upon either side of brake valve casing 19 and each of the valve casings 29 houses a pair of similar valve structures, one pair for the front brake actuators and another pair for the rear brake actuators. Since each of the safety valves is of identical construction, one only will be described.

Within the valve casing 29, there is disposed a slidable valve element 30 dividing the casing into an upper chamber 31 and a lower chamber 32. The latter communicates directly with the chamber 27 of the brake valve through a passage 33 and also with the brake conduit 14 through a passage 34. The brake valve chamber 27 also communicates with chamber 31 through a port 35 and the construction is such that in normal operation the valve element 30, having equal effective areas upon opposite sides thereof, is subjected to identical pressures obtained from the chamber 27 of the brake valve.

In operation of the above described system, brake-applying movement of the lever 22 will operate the brake valve to close the exhaust valve 21, open the intake valve 20 and charge chamber 27 with fluid pressure from the reservoir 15. Fluid pressure will be conducted from this reservoir through ports 33 and 35 to the respective chambers 32 and 31, and in order to insure that the valve element 30 will remain in the position shown during this phase of the operation, the port 35 is restricted relative to the port 33. From such a construction, it will be apparent that the rate of pressure build-up within chamber 31 and hence upon the upper face of valve element 30 will be slower than the rate of pressure build-up within chamber 32. The latter chamber communicates through passage 34 directly with the brake conduit 14, and thus fluid pressure will be conducted to one of the rear brake chambers to apply the associated vehicle brake. Simultaneously with the operation of said last named brake chamber, the remaining brake chambers will be supplied with fluid pressure in a similar manner. Since the fluid pressure above and below the valve element 30 will eventually attain the same value, a light spring 36 is employed for maintaining the valve element in the position shown.

In the event of rupture or breakage of the conduit 14 or brake chamber 6 communicating therewith, the valve element 30 will, upon charging of the chamber 27 through operation of the brake valve 23, move downwardly to close passage 33, thus interrupting communication between the brake valve and the damaged conduit. In order that this function of the valve element 30 may be clearly understood, it is to be pointed out that the passage 34 leading from the chamber 32 to the conduit 14 is slightly larger in cross-sectional area than the passage 33 which connects the chambers 32 and 27. Thus, upon charging of the chamber 27, the chamber 31 above the valve element 30 will be charged through passage 35 to the same pressure as that prevailing in chamber 27 while the pressure within the chamber 32 beneath the valve element 30 will be less than the pressure within chamber 27 due to the broken conduit 14 and to the inability of the fluid pressure to build up beneath valve element 30. Thus a pressure differential will immediately be created across the valve element and the latter will move downwardly to close off the passage 33.

Although the operation of the safety valve has been described above in connection with one conduit 14, it is to be understood that since each conduit is provided with such a valve and each communicates with the brake valve chamber 27, the operation will be similar in the event of failure of any of the remaining conduits. In this connection, it is desired to point out that in certain cases, it may be desirable to have the effective area of the opening of the intake valve 20 of the brake valve 23 slightly greater than the combined areas of three of the ports 33, in order to insure an ample supply of fluid pressure to the brake valve chamber 27 irrespective of the rupture of three brake conduits.

It will be readily understood from the foregoing description that the present invention provides a novel and effective manner of increasing the braking efficiency and safety of fluid pressure braking systems employing an expansible fluid pressure medium. In systems of this character heretofore utilized, a broken conduit generally rendered the fluid pressure system entirely inoperative by reason of the leakage of pressure medium through the broken conduit. With the present arrangement, however, the broken conduit is sealed immediately upon actuation of the brake valve and thus no loss of pressure medium takes place. On the contrary, full reservoir pressure is available for use with the remaining brake chambers and hence the vehicle may be safely operated until an opportunity is offered for permanently repairing the broken conduit.

While only one form of the invention has been illustrated herein, it is to be understood that various changes and rearrangements of the parts may be resorted to without departing from the spirit of the invention. Reference will, therefore, be had to the appended claims for a definition of the limits of the invention.

What is claimed is:

1. In a fluid pressure braking system having a brake actuator, valvular means for controlling the application and exhaust of an expansible fluid pressure medium to and from said actuator, a conduit connecting said means and actuator, and a single unitary normally unbalanced valve associated with said conduit, resiliently maintained in open position during normal operation of said system and automatically closing said conduit upon a sudden reduction in pressure in the latter due to a break therein.

2. In a fluid pressure braking system having a brake actuator, valvular means for controlling the application and exhaust of an expansible fluid pressure medium to and from said actuator, a conduit connecting said means and actuator, and a valve associated with said conduit, said valve being normally subjected at opposite ends thereof to equal pressures, and resilient means for normally maintaining said valve in open position independently of the fluid pressure medium whereby flow of fluid pressure to and from said actuator will be normally unobstructed during normal operation of the system, said valve automatically closing said conduit upon a sudden reduction in pressure in the latter due to a break therein.

3. In a fluid pressure braking system having a brake actuator, valvular means for controlling the application and exhaust of an expansible fluid pressure medium to and from said actuator, a conduit connecting said means and actuator, a valve casing interposed between said conduit and valvular means, a valve element slidable in said casing, means for subjecting said element at opposite ends thereof to equal pressures during operation of said valvular means, and resilient means for normally maintaining said valve element in open position independently of the fluid pressure medium whereby flow of fluid to and from said actuator will be normally unobstructed, said element automatically closing communication between said valvular means and conduit when the pressure in the latter is suddenly reduced due to a break therein.

4. In a fluid pressure braking system having a brake actuator, valvular means for controlling the application and exhaust of an expansible fluid pressure medium to and from said actuator, a conduit connecting said means and actuator, a valve casing interposed between said conduit and valvular means, a valve element slidable in said casing, resilient means for normally maintaining said valve element in open position independently of the fluid pressure medium whereby flow of fluid to and from said actuator will be normally unobstructed, and means effective in the event of a break in said conduit for subjecting the opposite ends of said element to different pressures upon actuation of said valvular means whereby said element is moved to close off communication between said valvular means and said conduit.

5. In a fluid pressure braking system having a brake actuator, a conduit connected therewith, valvular means including a casing together with means for connecting said casing with said conduit for controlling the admission and exhaust of an expansible fluid pressure medium to and from said actuator, means operable in the event of a break in said conduit for interrupting communication between the conduit and casing upon actuation of said valvular means comprising a valve having one end thereof subjected to the pressure of the medium, and means separate and independent of said connecting means for subjecting the other end of said valve to the pressure in said casing, said valve being balanced when said pressures are equal.

6. In a fluid pressure braking system having a brake actuator, a conduit connected therewith, valvular means including a casing together with means for connecting said casing with said conduit for controlling the admission and exhaust of an expansible fluid pressure medium to and from said actuator, and means operable in the event of a break in said conduit for interrupting communication between the conduit and casing upon actuation of said valvular means comprising a valve independent of said connecting means, means for subjecting one end of said valve to the pressure in said casing, and means independent of said last named means for subjecting the other end of said valve to the pressure in said conduit, said last two means being so constructed that the pressure on the one end of said valve is less than the pressure on the other end thereof when the pressure in said conduit is increasing during actuation of the valvular means.

7. In a fluid pressure braking system having a brake actuator, a conduit connected therewith, valvular means including a casing together with means for connecting said casing with said conduit for controlling the admission and exhaust of an expansible fluid pressure medium to and from said actuator, and means operable in the event of a break in said conduit for interrupting communication between the conduit and casing upon actuation of said valvular means comprising a valve independent of said connecting means, a connection between said casing and one end of said valve only, and a second connection between the casing and the other end of the valve independent of the first connection, said second connection communicating with the conduit.

8. In a fluid pressure braking system having a brake actuator, a conduit connected therewith, valvular means including a casing communicating with said conduit for controlling the admission of an expansible fluid pressure medium to said actuator, a valve having one end subject to the pressure in said conduit, and means for subjecting the other end of said valve to the pressure within said casing, said means being constructed as to effect a slower build-up of pressure upon said other end of the valve than upon said one end upon actuation of said valvular means.

9. In a fluid pressure braking system having a brake actuator, a conduit connected therewith, valvular means including a casing communicating with said conduit for controlling the admission of an expansible fluid pressure medium to said actuator, and means operable in the event of a break in said conduit for interrupting communication between the conduit and casing upon actuation of said valvular means comprising a valve, means for subjecting one end of said valve to the pressure in said casing, and means independent of said last named means for subjecting the other end of said valve to the pressure in said conduit, said last two means being so constructed as to effect a slower build-up of pressure upon said one end of the valve than upon said other end of the valve upon operation of said valvular means.

10. In a fluid pressure braking system having a brake actuator, a conduit connected therewith, valvular means including a casing together with means connecting said casing with said conduit for controlling the admission and exhaust of an expansible fluid pressure medium to and from said actuator, and means operable in the event of a break in said conduit for interrupting communication between the conduit and casing upon actuation of said valvular means comprising a valve, one end of which is subject to the pressure of the medium in said conduit, and a connection between said casing and the other end of the valve, arranged in parallel with respect to said connecting means.

11. In a fluid pressure braking system having a plurality of brake actuators, a conduit for each actuator, valvular means including a casing connected with each conduit for controlling the admission and exhaust of an expansible fluid pressure medium to and from said actuators, and means operable in the event of a failure of any of said conduits for interrupting flow of fluid pressure therethrough comprising valves individually associated with each conduit and separately and independently subjected upon their opposite ends to the pressure in said conduits and to the pressure in said casing, said means including ports so constituted as to effect a slower build-up of pressure on the valve ends subjected to the pressure in the casing than on the other ends thereof upon operation of the valvular means.

12. In a fluid pressure braking system having a brake actuator, valvular means for controlling the application and exhaust of an expansible fluid pressure medium to and from said actuator, a conduit connecting said means and actuator, and means interposed between said valvular means and conduit for interrupting the flow of fluid therebetween in the event of a break in said conduit, comprising a casing having a chamber, a port for connecting said chamber to the valvular means, a second chamber having connections with said valvular means and conduit, a passage between said chambers, and a valve slideably mounted in said passage for preventing the flow of fluid through said port and first-named chamber to said second chamber, said valve being operable by an excess of pressure in said first-named chamber for closing the connection between the second chamber and the conduit.

WILFRED A. EATON.